Nov. 22, 1960   J. J. PIPPENGER   2,961,001
PILOT CONTROLLED VALVE
Filed July 25, 1956
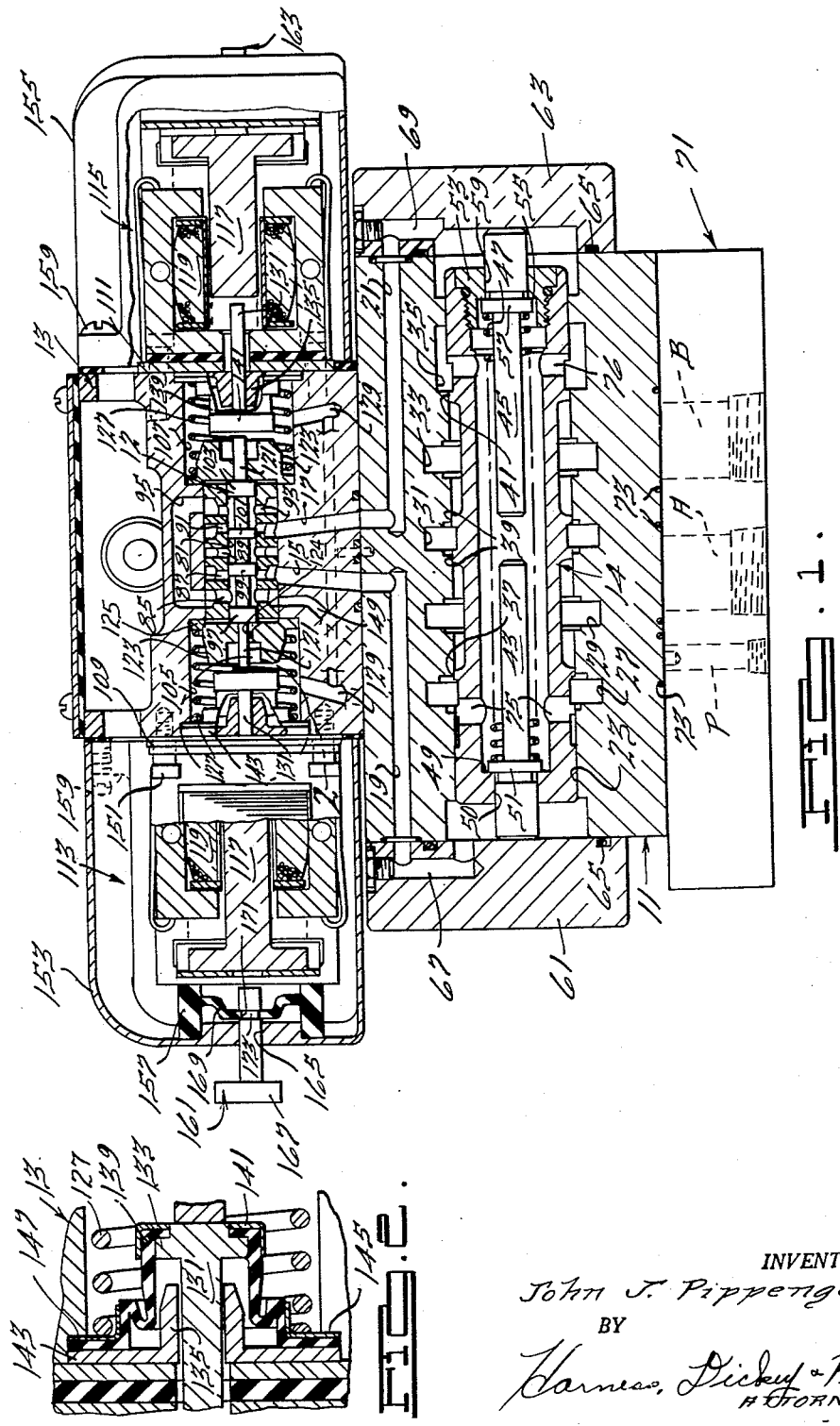
INVENTOR.
John J. Pippenger.
BY
Harness, Dickey & Pierce
ATTORNEYS.

United States Patent Office 2,961,001
Patented Nov. 22, 1960

2,961,001

PILOT CONTROLLED VALVE

John J. Pippenger, Manchester, Mich., assignor to Double A Products Company, Manchester, Mich., a corporation of Michigan Filed July 25, 1956, Ser. No. 599,961

6 Claims. (Cl. 137—623)

This application is a continuation-in-part of my co-pending application Serial No. 489,874, filed February 23, 1955.

This invention relates to hydraulic valves, and more particularly to a pilot controlled valve for directing the flow of hydraulic fluid under pressure.

One object of the present invention is to provide an improved 4-way, pilot controlled, hydraulic valve.

Another object is to provide an improved valve which will alternately direct the flow of hydraulic fluid from one conduit to another in a positive and uniform manner.

Another object is to provide an improved valve which is substantially unaffected by vibrations and other external physical disturbances.

Another object is to provide an improved, solenoid controlled, 4-way, hydraulic valve, which is especially adapted for use as a pilot valve to control another larger hydraulic valve.

Another object is to provide a valve which is hydraulically operated by a solenoid actuated pilot valve wherein hydraulic fluid is effectively prevented from leaking into contact with the actuating solenoids and thereby rendering them inoperative.

A further object is to provide an improved seal for preventing the aforementioned leakage of hydraulic fluid.

A still further object of the present invention is to provide a valve of the aforementioned type which is relatively inexpensive to manufacture, durable in construction and efficient in operation.

Further objects and advantages of the present invention will become apparent from the following detailed description, taken in conjunction with the accompanying drawings, wherein:

Figure 1 is a sectional view of a pilot operated, 4-way valve embodying the features of the present invention; and Fig. 2 is an enlarged, sectional view of the portion of the structure shown in Fig. 1 enclosed in the circle "2" thereof.

Referring now to the drawings, Fig. 1 illustrates a 4-way valve designed to regulate the direction of flow of hydraulic fluid through an external circuit (not shown). The valve includes a lower housing 11 rigidly secured to an upper housing 13, the latter containing a solenoid operated pilot valve spool 12 which is connected to control the position of a main valve spool 14, supported in the lower housing 11. The pilot valve spool 12 directs the flow of hydraulic fluid through passageways 15 and 17 in the upper housing 13 into passageways 19 and 21, respectively, in the lower housing 11 to operate the main valve spool 14. The hydraulic fluid flowing through said passageways may be under comparatively low pressure and be contained within a separate and distinct hydraulic system from the hydraulic fluid controlled by the main valve spool 14, which may be utilized in the operation of heavy hydraulically operated equipment and machinery. Alternatively, these passageways may be supplied from the same source of hydraulic fluid as the system controlled by the main spool 14. Provision is made for connecting the two systems internally within the lower housing 11, in which case the pilot pressure port P is closed by a plug.

The lower housing 11 is provided with a cylindrical bore 23 extending therethrough, and the main valve spool 14 is reciprocally supported therein. The wall of the bore 23 is circumferentially recessed at longitudinally spaced points to provide five annular grooves, or passageways 27, 29, 31, 33 and 35 in communication with the bore. The spool 14 is provided with a series of longitudinally spaced lands 37, 39 and 41 thereon which slidably engage the wall of the bore 23 so as to prevent the passage of hydraulic fluid thereby. The portions of the spool 14 between the lands 37 and 39 and between the lands 39 and 41 are of less diameter than the bore 23, thereby permitting the free flow of hydraulic fluid between the lands. The grooves 29 and 33 communicate through ports (not shown) with separate outlets A and B, which are adapted to be connected to a hydraulic motor, such as a piston and cylinder unit, to control the flow of fluid to the motor and thus control the operation of the same in a conventional manner. The grooves 27 and 35 communicate through ports (not shown) with a hydraulic fluid reservoir tank (not shown) maintained at low pressure, such as atmospheric pressure. The groove 31 communicates through a port (not shown) with a suitable hydraulic fluid pressure pump (not shown).

The spool 14 is reciprocable in its bore 23 between two operative positions, to direct the flow of hydraulic fluid alternately through the outlets A and B. The spool 14 is tubular and is internally spring-centered in the position shown in Fig. 1 to a central, inoperative position in which the input groove 31 is sealed off by the land 39 so that hydraulic fluid in the groove 31 is prevented from entering the bore 23, and is not directed into either of the outlet ports A or B. A preferred spring centering arrangement for the main spool 14, as shown in the drawing, includes a pair of spring followers 43 and 45 mounted within the spool 14 and urged apart, axially outwardly, by a compression coil spring 47. At one end the spool 14 bears an inwardly extending, annular flange 49 which engages an annular boss 51 on the follower 43 to retain the follower 43 within the spool. The flange 49 defines an axially extending aperture 50 through which the cam follower 43 projects. At its other end, the spool 14 is internally threaded to receive a plug member 53 which is provided with an internal annular shoulder 55 to engage the annular boss 57 on the follower 45 to limit the axial travel of the follower 45. The plug 53 defines a central aperture 59 through which the follower 45 projects. The bore 23 is closed at its ends by a pair of end caps 61 and 63 which are firmly secured to the housing 11 by any convenient means (not shown) such as screws, and are sealed against the housing 11 as by O-rings 65 to prevent loss of fluid from the bore 23. The spring followers 43 and 45 are proportioned so that when the spool 14 is in its central, inoperative position (as shown) they project beyond the ends of the spool and into contact with the end caps 61 and 63, respectively, and their bosses 51 and 57 engage the flange 49 and the shoulder 55, respectively. Thus, the centering spring 47, which is retained between the bosses 51 and 57 is limited in its expansion and is positioned to resist any displacement of the spool 14 from its central position. If, for example, the spool 14 is displaced to the right (as viewed in Fig. 1) it carries the left-hand follower 43 with it, while the right-hand follower 45 is prevented from moving by the end cap 63. Thus, any axial movement of the spool 14 serves to compress the spring 47, to increase its thrust upon the followers 43 and 45, and to increase the centering force translated through the followers to the spool.

It will be appreciated that other centering arrangements may be used in place of the preferred construction shown. For example, the main spool may be modified in form and hydraulically centered according to known techniques; or centering springs may be mounted between the ends of the spool 14 and the end caps 61 and 63. The present structure is preferred, however, since it is positive in action, relatively trouble-free, and extremely compact.

The passageways 19 and 21 in the housing 11 communicate through passageways 67 and 69 in the end caps 61 and 63, respectively, with the bore 23. When hydraulic fluid is admitted by the pilot valve into either of the passageways 19 or 21, it travels therethrough and through one of the passageways 67 and 69 into one end of the bore 23 to exert pressure against the end of the valve spool 14 to move the valve spool 14 in a desired direction. When, for example, hydraulic fluid is admitted under pressure into the passageway 19, it flows therethrough and through the passageway 67, and engages the left-hand end of the main spool 14 to drive the spool 14 to the right, as shown in the drawing. When the main valve spool 14 is moved to the right, it establishes communication between the inlet groove 31 and the left-hand outlet groove 29, allowing hydraulic fluid to flow from the inlet groove 31 through the outlet groove 29 and thence into and through the left-hand port A. It will thus be seen that as the spool 14 reciprocates from one operative position to the other, hydraulic fluid under pressure will be alternately directed from the pump through outlets A and B. When the pilot valve spool 12 is not actuated, fluid is directed into neither of the passageways 19 and 21, and the main valve spool 14 remains in its centered position and hydraulic fluid in the main circuit is cut off and does not flow into either of the outlet ports A or B.

Hydraulic circuit connections are made to the lower housing 11 through a subplate 71 which is rigidly secured to the housing 11 and sealed thereto as by O-rings 73, which are positioned around each port as required. The subplate 71 is arranged, according to conventional practice, so that all hydraulic connections to the valve assembly are made through the subplate.

The end grooves 27 and 35 serve as return passageways for hydraulic fluid from the low-pressure, or exhaust side of the hydraulic circuit controlled by the main spool 14. When, for example, the spool 14 is moved to the left as viewed in the drawing to admit fluid under pressure into the outlet port B, exhaust fluid is normally returned and enters the valve through the outlet A. This exhaust fluid passes through passageways (not shown) into the groove 29 and through the bore 23 into the end groove 27. The end groove 27 is ported to a passageway (not shown) leading to a drain, or to a fluid reservoir (not shown) to allow ready escape of the exhaust fluid from the valve.

The opposite groove 35, however, is not ported. When the main spool 14 is moved to the right, the exhaust fluid which enters the groove 35 (from the outlet port B and the groove 33) passes through radial aperture 76 into the interior of the spool 14, along the length of the spool 14, and then through another set of radial apertures 75 into the end groove 27. Thus, although both of the grooves 27 and 35 serve as return passageways, only one return line, or passageway need be provided in the housing 11 to return exhaust fluid to the reservoir.

Control of the position of the main spool 14 in its bore 23, by the admission of hydraulic fluid under pressure alternately into the passageways 19 and 21, is effected by the aforementioned solenoid actuated pilot control valve mounted in the upper housing 13. The upper housing portion 13 is provided with a bore 81 in which the pilot valve spool 12 is reciprocally mounted. The bore 81 is provided with five spaced annular grooves, or passageways 85, 87, 89, 91 and 93 communicating therewith, the two end grooves 85 and 93 being connected together by a passageway 95 formed within the wall of the housing 13. The pilot spool 12 is provided with four lands 97, 99, 101 and 103 for controlling the flow of hydraulic fluid between these passageways. The housing portion 13 is further provided with coaxially aligned cylindrical recesses 105 and 107 at either end thereof which communicate and are coaxial with the bore 81. Centrally apertured cover plates 109 and 111 are mounted on opposite ends of the upper housing 13 covering the recesses 105 and 107, respectively. Fixedly mounted at the ends of the upper housing 13 and abutting the cover plates 109 and 111 are identical solenoids 113 and 115. Each solenoid is provided with an armature 117 and a coiled wire field 119 peripherally surrounding the armature.

The pilot spool 12 is provided at each end thereof with extending portions 121 of a reduced diameter. Each of the end portions 121 reciprocates within and slidably engages bushings 123 which are slidably mounted within the recesses 105 and 107. Each of the bushings 123 is provided with an annular outer flanged portion 125 which is urged against the inner end walls of the recesses 105 and 107 by a coiled centering spring 127. The bushings 123 are provided with axial holes 124 to form passageways for hydraulic fluid out of the bore 81 into the recesses 105 and 107. The recesses 105 and 107 are connected to a drain 129 so that hydraulic fluid which leaks past the lands of the spool 12 into the recesses 105 and 107 may readily drain out of the recesses and into a suitable reservoir.

Sealing means are provided between the recesses 105 and 107 and the respective solenoids 113 and 115 in order to prevent any fluid from entering the solenoids and damaging them. Incorporated in and forming a part of the sealing units are actuator plungers 131 for transmitting movement from the armatures 117 to the spool 12 in order to reciprocate the spool. Fig. 2 illustrates one of the actuator plungers and sealing units disposed between the reduced spool end portions 121 and the armatures 117. Each actuator plunger 131 is provided with an annular flanged portion 133 closely spaced from the inner end thereof. The outer end of the plunger 131 is disposed within the solenoid and positioned for engagement by the armature 117 when the field 119 is energized. A bushing 135 abuttingly engaging the inner surface of the cover plate 109 serves as a guideway in which the plunger 131 is slidably supported. A tapered, vulcanized rubber, bellows-like sleeve or boot 139 is fitted at its smaller end around the flange portion 133 and is held in sealing engagement thereto by an annular sheet metal ring 141 crimped around the flange 133. The larger end of the rubber sleeve 139 is flattened against a flanged portion 143 provided on the outer end of the bushing 135. A metal washer 145 is bonded to the wide end of the rubber sleeve 139, forming an engaging surface against which the spring 127 is seated. The rubber sleeve 139 is of such length as to permit free movement of the actuating plunger 131 when it is moved inwardly by the action of the armature 117. The extreme outer ends of the recesses 105 and 107 are of slightly greater diameter than the main portion of the recesses, forming a small shoulder 147, which the washer 145 abuts, and which holds the bushing 135 in place against the cover plate 109 or 111.

It may thus be seen that the rubber sleeves 139, fitted around the inner ends of the actuator plungers 131 and closing off the ends of the recesses 105 and 107, form secure seals preventing pilot drain fluid which may leak into the recesses 105 and 107 from further leaking into the solenoids 103 and 104. The actuator plungers 131 and their respective seals form separate units which only abuttingly engage the pilot valve spool 12 and are in no way secured thereto.

When neither of the solenoids is actuated, the centering springs 118 hold the pilot spool valve 12 in its neutral position, as illustrated in the drawing. In this position, the lands 99 and 101 partially block off the grooves 87 and 91 that communicate with the passageways 15 and 17, respectively, preventing flow of hydraulic fluid from the input groove 89 into the grooves 87 and 91 but allowing fluid to flow from the grooves 87 and 91 into the drain grooves 85 and 93, respectively. The grooves 85 and 93 are connected to a pilot drain 149 so that leakage oil cannot build up pressure in the passageways 15 and 17 while the solenoids are de-energized and the pilot spool 12 is in its neutral position. When either solenoid is energized, its armature 117 is forced inwardly to engage the actuator plunger 131, moving the plunger and the entire pilot valve spool 12 axially along the cylinder bore 81. When, for example, the left-hand solenoid 113 is actuated, the valve spool 12 will be moved to the right as shown in the drawing so as to permit free flow of fluid from the central groove 89, which is connected to a suitable hydraulic pump (not shown) into the groove 91 leading to the passageway 17 and thence to the right-hand end of the main valve spool 14 to force the main spool 14 to the left (as shown). When the right-hand solenoid 105 is actuated, the spool 12 will be moved in a left-hand direction, opening the groove 89 so as to permit the flow of fluid from the input groove 89 into the outlet groove 87, and thence through the passageway 15 and into the left-hand end of the lower housing 11 to move the main spool 14 to the right.

When the main valve spool 14 is moved to the left, for example, as shown in the drawing, the fluid in the left-hand end of the bore 23 is displaced therefrom through the passageways 67, 19 and 15 into the groove 87 of the pilot bore 81, thence through the bore 81 between the lands 97 and 99, and into the pilot outlet groove 85 from where it is free to enter the drain 149. The land 97 prevents the accumulation of back pressure, during return of hydraulic fluid in this manner, from affecting the operation of the pilot valve spool 12, since the axial thrust of hydraulic fluid in the bore 81 against the land 99 is exactly compensated for and equalized by thrust in the opposite direction against the land 97. Thus, the net force exerted on the valve spool 12 by the returning hydraulic fluid is radial only, and the pilot spool 12 may be rapidly reversed in position, even before completion of travel of the main spool 14, or before the back pressure of the returning actuating fluid has been dissipated.

The actuating solenoids 113 and 115 are retained in alignment with the pilot valve spool 12 by means of shoulder screws 151 which retain the cover plates 109 and 111 firmly and securely in position on the body 13, but permit limited axial movement of the solenoids 113 and 115, this limited axial movement being approximately equal to the maximum travel of the armatures 117. When the solenoids 113 and 115 are moved outwardly to the limit of their permissible travel on the shoulder screws 151, the armatures 117 are effectively disengaged from the actuating rods 131 so that the solenoids are ineffective to actuate and to control the pilot valve spool 12. The solenoids are urged toward their operative positions, however, within separate housing members 153 and 155 by resilient annular, biasing members 157 (only one of which is shown) which may be of rubber or similar material and are disposed between the inner ends of the housing members 153 and 155 and the outer ends of the solenoids 113 and 115. These resilient members 157 serve as shock absorbers to prevent damage to the valve and other parts of the assembly that might otherwise be occasioned by the relatively rapid action of the solenoids 113 and 115. They cushion the initial impact of the solenoids upon the pilot spool 12, and also absorb any shock imposed on the solenoids by overtravel of the pilot spool. The housing members 153 and 155 are removably secured to the upper housing 13 by any convenient means, such as a series of annularly spaced screws 159.

Another feature of this construction is that it makes operation of the control valve assembly relatively difficult unless the housing members 153 and 155 are securely mounted on the housing 13. The application of electrical signals to the solenoids 113 and 115 will have no effect upon the valve spools 12 and 14 unless the housing members 153 and 155 are secured in place to urge the solenoids resiliently toward the housing 13. Thus, contamination of the solenoids 113 and 115 through prolonged operation without the dust covers is effectively prevented.

Provision is also made for manual operation of the pilot valve spool 12 through a pair of plungers 161 and 163 slidably fitted through apertures 165 in the end walls of the housing members 153 and 155 in alignment with the armatures 117. By pushing on the plungers 161 or 163, the armatures 117 and the valve spool 12 may be moved to actuate the main valve spool 14 without electrically energizing the solenoids. This feature permits manual actuation of the valve to check its operation and the operation of equipment controlled by it. The plungers 161 and 163 may be provided with caps, such as the cap 167 on the left-hand plunger 161 for simple, ready hand actuation. Alternatively, they may be tool operated, if desired, such as the right-hand plunger 163. The entry of dust or other contaminating matter into the housing members 153 and 155 through the apertures 165 is prevented by means of flexible web, or diaphragm portions 169 formed integrally with the resilient members 157 and apertured, as at 171, to fit tightly around the plungers 161 and 163, and to engage them by means of annular grooves 173. These diaphragm portions 169 are cup-shaped and are resilient so that they act as springs to return the plungers 161 and 163 to their retracted positions when they are released.

What is claimed is:

1. A solenoid actuated hydraulic valve comprising a housing having a bore therein, a valve spool reciprocally mounted within said bore to control the flow of a hydraulic fluid therethrough, an electrical solenoid mounted at one end of said housing and having its armature aligned with said spool, a plunger rod slidably mounted between said pool and said armature and abuttingly engageable by said armature and said spool, said solenoid being axially movable with respect to said bore, and resilient means to normally bias said solenoid toward said housing.

2. A solenoid actuated hydraulic valve comprising a housing having a bore therein, a valve spool reciprocally mounted within said bore to control the flow of a hydraulic fluid therethrough, a pair of electrical solenoids mounted at opposite ends of said housing and having their armatures aligned with said valve spool, plunger rods slidably mounted between said valve spool and said armatures and abuttingly engageable by said armatures and said spool, said solenoids being axially movable within fixed limits with respect to said bore, and resilient means to urge said solenoids toward said housing.

3. A solenoid actuated hydraulic valve comprising a housing having a bore therein, a valve spool reciprocally mounted within said bore to control the flow of a hydraulic fluid therethrough, an electrical solenoid mounted at one end of said housing and having its armature aligned with said spool, a plunger rod slidably mounted between said spool and said armature and abuttingly engageable by said armature and said spool, said solenoid being movable toward and away from said housing through a predetermined limited distance, an auxiliary cover member secured to said housing and substantially enclosing said solenoid, an actuating rod slidably supported by and extending through one wall of said cover member, said actuating rod being aligned with and engageable by said armature, and resilient means disposed between said solenoid and one wall of said cover member to normally bias said solenoid toward said housing.

4. A solenoid actuated hydraulic valve comprising a housing having a bore therein, a valve spool reciprocally mounted within said bore to control the flow of a hydraulic fluid therethrough, an electrical solenoid mounted at one end of said housing and having its armature aligned with said spool, a plunger rod slidably mounted between said spool and said armature and abuttingly engageable by said armature and said spool, said solenoid being movable toward and away from said housing, an auxiliary cover member secured to said housing and substantially enclosing said solenoid, resilient means disposed between said solenoid and one wall of said cover member to normally bias said solenoid toward said housing, and an actuating member aligned and abuttingly engageable with said armature and extending through an aperture in said cover member to the exterior thereof, said actuating member being flexibly sealed to said cover member by said resilient means and having sufficient permissible movement to effect manual operation of said valve.

5. In combination with a hydraulic valve of the type including a housing having a bore therein, a valve spool reciprocally mounted within said bore to control the flow of a hydraulic fluid therethrough, the improvement comprising an electrical solenoid mounted at one end of said housing and having its armature aligned with said spool, a plunger rod slidably mounted between said spool and said armature and abuttingly engageable by said armature and said spool, said solenoid being movable toward and away from said housing, an auxiliary cover member secured to said housing and substantially enclosing said solenoid, an actuating rod slidably supported by and extending through one wall of said cover member, said actuating rod being aligned with and engageable by said armature, a resilient annular member mounted on one wall of said cover member adjacent to said solenoid and positioned to urge said solenoid resiliently toward said housing, said annular member including integrally therewith a central web portion defining an aperture, and an actuating plunger aligned and abuttingly engageable with said armature and fitted within said aperture and extending slidably through an aperture in said cover member, said web portion forming an effective seal against said actuating plunger and being distortable to permit movement of said actuating plunger for manual operation of said valve.

6. A solenoid actuated hydraulic valve comprising a housing having a bore therein with an enlarged recess at one end thereof, a valve spool reciprocally mounted within said bore and to control the flow of a hydraulic fluid therethrough and having a reduced end portion projecting into said recess, a bushing within said recess and slidably disposed on said reduced end portion, a cover plate having a central aperture therein coaxially aligned with said valve spool and secured to said housing so as to enclose said recess, a spring disposed within said recess between said bushing and cover plate to normally bias said bushing and valve spool away from said cover plate, a plunger rod slidably mounted in said central aperture and having an enlarged flange on one end thereof abuttingly engageable with said reduced end portion which projects through a predetermined distance beyond said bushing, said enlarged flange being abuttingly engageable with said bushing after it has engaged said reduced end portion to limit the axial movement of the valve spool by the pusher rod, an electric solenoid slidably mounted on said cover plate for movement toward and away from said housing a predetermined limited distance, an auxiliary cover member secured to said housing and substantially enclosing said solenoid, and resilient means disposed between said solenoid and the wall of said cover member to normally bias said solenoid toward said housing.

References Cited in the file of this patent

UNITED STATES PATENTS

| 1,230,934 | Skinner | June 26, 1917 |
| 1,533,128 | Meyers | Apr. 14, 1925 |
| 2,444,471 | Samiran | July 6, 1948 |
| 2,544,491 | Davis | Mar. 6, 1951 |
| 2,591,800 | Gardiner | Apr. 8, 1952 |
| 2,620,822 | Peterson et al. | Dec. 9, 1952 |
| 2,623,766 | Richard | Dec. 30, 1952 |
| 2,735,644 | Bishofberger | Feb. 21, 1956 |
| 2,780,755 | Ludwig | Feb. 5, 1957 |

FOREIGN PATENTS

| 640,233 | France | Mar. 24, 1928 |